Figure 1:
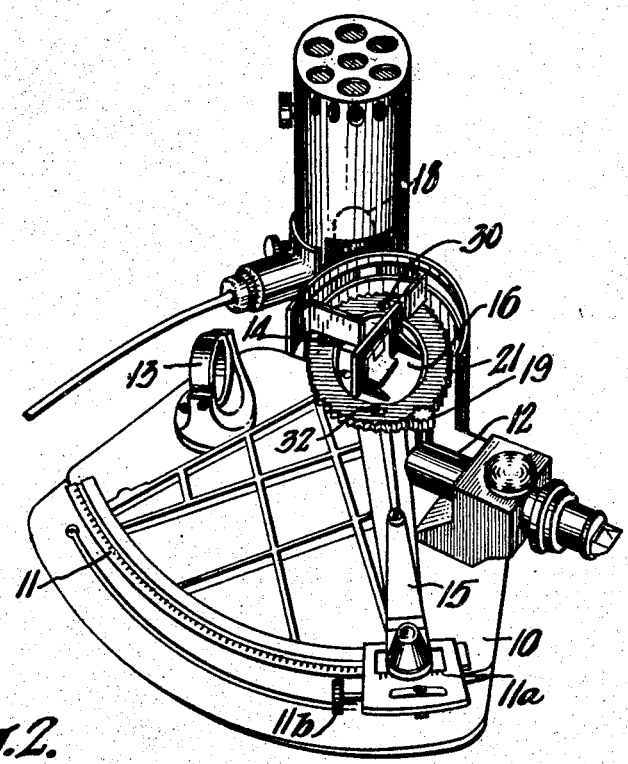

Aug. 12, 1947.    L. T. SACHTLEBEN    2,425,399
METHOD AND APPARATUS FOR MEASURING THE INDEX OF REFRACTION
OF THIN LAYERS OF TRANSPARENT MATERIAL
Filed June 17, 1943    2 Sheets-Sheet 1

Inventor
Lawrence T. Sachtleben
By
Attorney

Aug. 12, 1947.  L. T. SACHTLEBEN  2,425,399
METHOD AND APPARATUS FOR MEASURING THE INDEX OF REFRACTION
OF THIN LAYERS OF TRANSPARENT MATERIAL
Filed June 17, 1943  2 Sheets-Sheet 2

Inventor
Lawrence T. Sachtleben
By
C. D. Tuska
Attorney

Patented Aug. 12, 1947

2,425,399

UNITED STATES PATENT OFFICE 2,425,399

METHOD AND APPARATUS FOR MEASURING THE INDEX OF REFRACTION OF THIN LAYERS OF TRANSPARENT MATERIAL

Lawrence T. Sachtleben, Indianapolis, Ind., assignor to Radio Corporation of America, a corporation of Delaware Application June 17, 1943, Serial No. 491,132

9 Claims. (Cl. 88—14)

This invention relates to refractometers and more particularly to refractometers for the measurement of the index of refraction of thin layers of transparent material. For many purposes it is desired to use very thin layers of transparent material having a thickness ranging from a very small fraction of a wave length of light up to sometimes as much as several wave lengths. For such purposes the materials are customarily deposited by evaporation in a vacuum. Even if the index of refraction of the material in its normal form is known, it does not necessarily follow that the index of refraction of the evaporated and deposited coating is the same. Depending upon the nature of the material, the evaporated coating may have a higher or lower index of refraction than the fused or crystalline original material and in some instances the composition of the evaporated coating is different than that of the original material, which also causes a change in index of refraction.

It is impractical to measure the index of refraction of such thin films by any of the more usual methods as practically all refractometers or spectrometers adapted for the measurement of refractive index require a specimen of considerable dimension. Even methods involving the use of a microscope are not adapted to measurement of the index of refraction of such thin films.

I have accordingly devised a novel type of refractometer for measuring the index of refraction for thin films by a method which is similar in some respects to that described by Blodgett in the Journal of the American Chemical Society, vol. 57, No. 6, June 1935, pages 1007 to 1022, and in a General Electric Research Laboratory Reprint No. 758.

The Blodgett method consists in observing a specially prepared specimen film in polarized light and determining Brewster's angle of polarization by viewing the specimen at different angles.

Blodgett measures refractive index by determining the polarizing angle by a sensitive method which depends upon interference between the light reflected from the air-film interface and from the film-glass or film-solid interface (the films being deposited upon the glass): and upon the fact that the reflected portion of a beam of light plane polarized parallel to the plane of incidence undergoes a phase reversal or change of 180 degrees as the value of this angle of incidence passes through the polarizing angle $\theta$ which $=\tan^{-1}\mu$. ($\mu=$the index of refraction of the specimen.)

In accordance with the present invention the matching of brightnesses of reflections from films of two different thicknesses which are changing in brightness in opposite directions at the polarizing angle is used to determine the reaching of that angle. My improved apparatus and method of operation is described in more detail hereinafter.

One object of the invention is to provide an improved type of refractometer and method of operation.

Another object of the invention is to provide a refractometer for measuring the index of refraction of thin transparent films.

Another object is to provide an improved refractometer and method of operation for determining the index of refraction by the measurement of Brewster's angle.

Another object of the invention is to provide a refractometer for measuring the index of refraction of thin films to a higher degree of precision than that heretofore attained.

Figure 2:
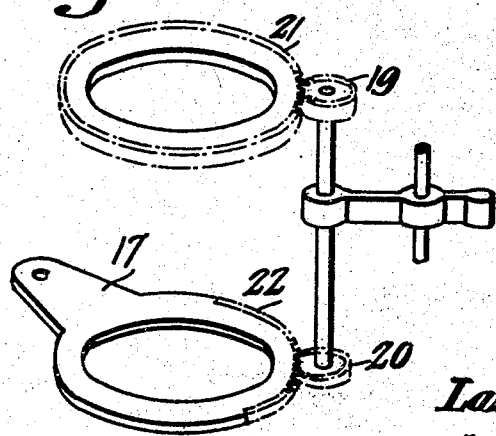
Figure 3:
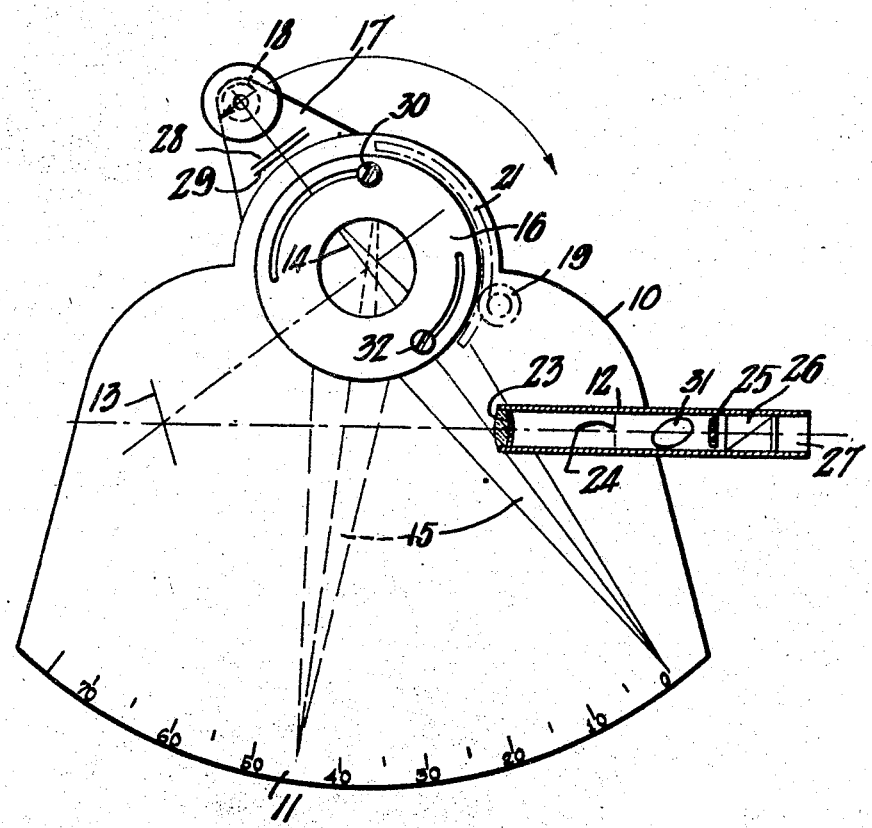

Other and incidental objects of the invention will be apparent to those skilled in the art from consideration of the following specification in connection with the accompanying drawings, in which:

Figures 1 and 2 are perspective views of the refractometer constructional details, and Figure 3 is a plan view schematically illustrating the optical system.

Corresponding reference numerals indicate corresponding parts in all the figures.

The instrument is provided with a base-plate 10 which is sufficiently massive to maintain the instrument in position during operation and to maintain the various parts of the instrument in their proper relative positions. On the base-plate is mounted the measuring portion of the instrument, which is basically similar to a mariner's sextant. In fact, a sextant can readily be reconstructed into an instrument of the present type by the addition and substitution of various parts while retaining the angle measuring mechanism.

The base-plate carries a graduated arc 11, which is immovably fixed thereon, and carries the usual movable arm 15 provided with a vernier scale 11a cooperating with the scale on the arc 11, and an appropriate slow motion screw 11b. A screw, not shown, is also provided to lock the arm 15 securely to the base-plate at any point of its travel.

A collimator tube 12, hereinafter described in more detail, is used instead of the usual sextant telescope, and an optical flat aluminized or silvered on its front surface is provided at 13 in approximately the relative position occupied by the horizon mirror in a sextant.

An arm 17 (Figs. 2 and 3) is mounted on the base-plate 10 for supporting a light source 18 which is covered by an appropriate housing to prevent the emission of stray light. The arm 17 is so mounted as to be rotatable about the same axis as the arm 15 and is connected thereto and to the specimen table 16 by the gearing 19, 20, 21, 22 (see Fig. 2). The gear ratios are so chosen that when the specimen 14, whose plane includes the axis of rotation of the arm 17, is moved a given amount by the arm 15, light from the source 18 reflected from the specimen 14 upon the optical flat 13 is reflected constantly toward the optical flat 13. The turntable 16 is rotatably mounted upon the extended spindle of the bearing of the arm 15 which is connected in fixed relation to the gear 21. The turntable 16 is secured to the gear 21 by the screw 32 which permits a relative movement of approximately 90 degrees of the specimen in relation to the arm and affixed gear. The screw 30 serves to secure the turntable 16 to the base-plate in any position within its permitted relative range of rotation of about 90 degrees.

The collimator 12 includes an achromatic objective 23, a plate having a narrow slit 24 therein at right angles to the plane of observation and an eye piece 25. A Nicol prism 26 polarizes the light emerging from the eye piece parallel to the plane of observation, which is parallel to the plane of incidence of the light upon the specimen. A plane including the optical axis of the collimator and perpendicular to the axis of rotation of the specimen is a plane of observation. A right angle prism 27 serves to direct the emergent beam of light upward for convenience in making observations. The slit 24, at right angles to the plane of observation, is located at a principal focus of the objective 23 and together with it serves to collimate the light in the plane of observation, thus insuring fixity of the direction of observation over the surface of the specimen 14 in all planes parallel to the plane of observation and polarization. In planes perpendicular to the plane of observation, the directions of the rays are not so restricted and as a result the resolving power in these planes exceeds that in those parallel to the plane of observation. The demarcation line in the specimen is set parallel to the plane of observation to take advantage of this greater resolving power and thus show up in the field of view with maximum sharpness and resolution. If the line of demarcation between the two different thickness layers of the specimen were set parallel to the slit, its image would be formed at low resolution and the two areas in the field would be separated by a soft or graded boundary rather than separated by a sharp line. The ability of the eye to detect brightness contrast depends upon the sharpness of the boundary between the two fields of contrasting brightness and the arrangement providing a very sharp boundary line increases the precision of the observation to a corresponding degree.

A 45 degree unsilvered glass plate 31 is introduced between the slit 24 and the eye piece 25 permitting the slit to be illuminated from the rear in the same general manner as in a Gauss ocular. With the eye piece 25 adjusted to focus upon the slit 24 which is illuminated by light reflected from the 45 degree plate 31, the specimen 14 is rotated until the image of the slit coincides with the slit. The screw 30 is then tightened, securing the turntable 16 to the baseplate 10. The screw 32 which secures the turntable 16 to the arm 15 is then loosened and the arm 15 is set to zero on the scale 11. Tightening 32 and loosening 30 then prepares the instrument for use after the eye piece 25 has been readjusted to focus upon the image of the specimen 14.

All observations using instruments of this type are necessarily taken at angles of observation in excess of 45 degrees. In order to operate from a zero setting to such angles of observation, the scale 11 would have to be at least 90 degrees long although the first half of this scale would never be used in taking observations except for the zero setting. If the specimen is set ahead 45 degrees, it shortens the necessary length of the scale 11 by that amount.

In order to set the specimen ahead 45 degrees, after the adjustment previously described has been accomplished, the arm 15 is moved to the 45 degree position indicated in dashed lines (Fig. 3), the screw 30 is then tightened securing the turntable 16 to the base-plate 10. The screw 32 which secures the turntable 16 to the arm 15 is then loosened and the arm 15 is set back to zero on the scale 11. The screw 32 is then tightened and the screw 30 is loosened, leaving the arm 15 and turntable 16 movable together and in a relative position 45 degrees ahead of the original adjustment.

During the course of these preliminary adjustments, the gear 21 is removed or otherwise disengaged from the remainder of the lamp driving gear train by any suitable means such as that illustrated by Fig. 2. Following these adjustments the gear is replaced or re-engaged, with the lamp on the line of the reflected axis of the collimator, and the instrument is ready for measurements.

Effective illumination of the specimen is furthered by the diffusing screen 28 and appropriate color filter 29.

The film to be measured is prepared by depositing the material on a flat glass surface either by evaporation, dipping or other means, such as chemical deposition to a thickness of ¼ of a wave length for that part of the spectrum at which the index is to be measured. When a thickness of ¼ of a wave length is attained, further deposition of the film is stopped in a suitable manner over half of the area of the specimen while the film is permitted to increase in thickness to a thickness of ½ a wave length over the remaining half of the specimen. The resulting specimen consists of a stepped film of two contiguous portions separated by a very narrow line of demarcation, one portion being twice the thickness of the other.

If the index of refraction of the material to be measured is lower than that of the underlying glass, the wave fronts reflected at angles under the polarizing angle from the air-film and the film-glass surfaces will combine in opposite phase where the specimen is ¼ wave length thick and will combine in the same phase where it is ½ wave length thick. The resultant intensities of the beams reflected from the two portions of the specimen are thus unequal. If the index of refraction of the material is greater than that of the glass, the reflected wave fronts will combine in the same phase from the thin portion of the film and out of phase from the thick portion, the resulting beams being also unequal. It will be clear that if in either of these cases the phase of the wave front reflected either from the air-film surface or from the film-glass surface could be caused to reverse, the two beams from the two halves of the specimen would exchange intensities. In order to accomplish this result, use is made of the fact that a beam of light plane polarized parallel to the plane of incidence is, for angles of incidence greater than the angle of polarization, reflected in phase opposite to the phase in which it is reflected for angles of incidence less than the polarizing angle. The angle at which this reversal of intensities occurs is accordingly used to measure the polarizing angle (Brewster's angle) and thereby the index of refraction.

When such a stepped film is constructed for light of a given wave length and is observed in that light, the light being plane polarized parallel to the plane of incidence, the two steps are seen to be unequal in brightness as just described. If the angle of observation is varied and made to approach the angle of polarization for the film the contrast in brightness between the two steps will be seen to gradually diminish until at the polarizing angle the two steps appear equally bright and no contrast is visible at the line of demarcation between them. At this point, the reflectivity at the air boundary of the film for light polarized as described reaches zero. Upon continuing to vary the angle of observation in the same direction, the reflectivity at the air boundary of the film again becomes finite and the two steps again become of unequal and contrasting brightness with the relative brightness of the steps reversed, due to the reversal of the phase of the light reflected at the air-film boundary after passing through the polarizing angle.

The high sensitivity of the eye to brightness contrast in conjunction with the reversal of contrast upon passing through the polarizing angle makes this method highly sensitive for determining the polarizing angle for a thin film.

In preparing the sample, a wedge-shaped support should be used so that reflections from the rear surface of the transparent support will not interfere with the measurements. The best result is obtained when the refracting edge of the wedge is set parallel to the plane of observation, and the extraneous reflection cast either upward or downward.

For best results the instrument must be provided with a system of baffles to intercept all but the light which is reflected into the collimator by the specimen itself. This is necessary not only to avoid dilution of the apparent brightness contrast of the specimen, but also to preserve the highly necessary dark adaptation of the eye which is required by the low brightnesses at which these observations are made. The apparatus, as actually constructed, included a baffle system consisting of plates which moved with the lamp house itself, and plates which were fixed to the base-plate of the instrument, the whole arrangement constituting a light trap which had sufficient flexibility to be effective for all positions of the instrument within its working range of adjustment. This baffle system has been omitted from Fig. 1 in order to simplify an understanding of other constructional details of the device.

I claim as my invention:

1. A refractometer including a rotatable specimen support, a light source rotatable about the same axis as said support for illuminating said specimen, a stationary observation member including means for polarizing the reflected light image of said specimen in a plane parallel to the incidence of the light on said specimen, and means for establishing between said support and said source a rotational speed relation such that a stationary light beam is directed toward said stationary observation member.

2. In a method of determining the index of refraction of one of two films of the same material which are applied to the same specimen with a boundary line therebetween and have thicknesses such that the thickness of one film differs from that of the other by one-quarter of the wave length of the light reflected from said specimen, the steps which include rotating said specimen about an axis perpendicular to said boundary line, applying light to said films in a plane parallel with said boundary line and at such angles that light is reflected constantly from said specimen to a fixed point, polarizing said reflected light in a plane parallel to said boundary, measuring the angle of incidence at which phase reversal of said reflected light is produced, and using said angle to compute said index.

3. In a method of determining the index of refraction of one of two films of the same material which are applied to the same specimen with a boundary line therebetween and have thicknesses such that the thickness of one film differs from that of the other by one-quarter of the wave length of the light reflected from said specimen, the steps which include rotating said specimen about an axis perpendicular to said boundary line, applying light to said films in a plane parallel with said boundary line and at such angles that light is reflected constantly from said specimen to a fixed point, polarizing said reflected light in a plane parallel to said boundary and restricting said reflected light along a line perpendicular to said boundary, measuring the angle of incidence at which phase reversal of said reflected light is produced, and using said angle to compute said index.

4. In a device which functions to present to the observer a contrast in the intensities of the beams reflected from the two parts of the stepped surface of a specimen, the combination of means for rotating said specimen about an axis which is perpendicular to the boundary between said parts, means rotated simultaneously with said specimen for applying light to said specimen in a plane parallel to said boundary and at such angles that the light beam reflected from said specimen is stationary, and means for polarizing said light in a plane parallel to said boundary.

5. In a device which functions to present to the observer a contrast in the intensities of the beams reflected from the two parts of the stepped surface of a specimen, the combination of means for rotating said specimen about an axis which is perpendicular to the boundary between said parts, means rotated simultaneously with said specimen for applying light to said specimen in a plane parallel to said boundary and at such angles that the light beam reflected from said specimen is stationary, means for polarizing said reflected light in a plane parallel to the plane of incidence of the light upon said specimen, and a light slit interposed in the path of said reflected light with its length dimension perpendicular to said boundary.

6. The combination of means for supporting a specimen having parallel plane surfaces separated by a boundary line, means for rotating said specimen about an axis perpendicular to said boundary line, means rotated simultaneously with said specimen for applying light to said specimen in a plane parallel to said boundary line and at angles such that the reflected light beam is stationary, and means for polarizing said reflected light in a plane parallel to said boundary.

7. The combination of a specimen support table, means for rotating said table about an axis perpendicular to its specimen supporting surface, means rotated simultaneously with said specimen for applying light to a specimen in a plane parallel with said surface and at angles such that the light beam reflected from said specimen is stationary, and means for polarizing said light in a plane parallel with said surface.

8. The combination of a specimen support table, means for rotating said table about an axis perpendicular to its specimen supporting surface, means rotated simultaneously with said specimen for applying light to a specimen in a plane parallel with said surface and at angles such that the light beam reflected from said specimen is stationary, means for polarizing said reflected light in a plane parallel to the plane of incidence of the light upon said specimen, and a light slit interposed in the path of said reflected light with its length dimension perpendicular to said surface.

9. The combination of a specimen support table, means for rotating said table about an axis perpendicular to its specimen supporting surface, means rotatable simultaneously with said specimen for applying light to a specimen in a plane parallel with said surface and at angles such that the light beam reflected from said specimen is stationary, a light slit interposed in the path of said reflected light with its length dimension perpendicular to said surface, means for polarizing said reflected light in a plane parallel to the plane of incidence of the light upon said specimen, and a diagonal mirror so related to said slit as to illuminate said slit on the side from which said reflected light passes for establishing a zero setting of said table.

LAWRENCE T. SACHTLEBEN.

REFERENCES CITED

The following references are of record in the file of this patent:

FOREIGN PATENTS

| Number | Country | Date |
|--------|---------|------|
| 97,515 | Germany | June 8, 1898 |
| 483,173 | France | Mar. 10, 1917 |

OTHER REFERENCES

"The Gloss Characteristics of Photographic Papers," an article by Jones et al. in British Journal of Photography for April 14, 1922. Pages 216–218 cited. (Copy in Scientific Library, U. S. Patent Office.) (88–14ZR.)

"Physics for Technical Students," by Anderson, pub. 1921; page 417 cited. (Copy in Div. 7, U. S. Patent Office.)